United States Patent
Ma

(10) Patent No.: US 8,205,079 B2
(45) Date of Patent: Jun. 19, 2012

(54) ENCRYPTION/DECRYPTION SYSTEM AND METHOD THEREOF

(75) Inventor: Xian-Wei Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 401 days.

(21) Appl. No.: 12/541,118

(22) Filed: Aug. 13, 2009

(65) Prior Publication Data

US 2010/0257371 A1 Oct. 7, 2010

(30) Foreign Application Priority Data

Apr. 2, 2009 (CN) .......................... 2009 1 0301315

(51) Int. Cl.
H04L 9/00 (2006.01)
H04L 9/32 (2006.01)
(52) U.S. Cl. ............. 713/165; 713/189; 726/26; 726/27
(58) Field of Classification Search .......... 713/164–165, 713/167, 189, 193–194; 726/26–30
See application file for complete search history.

(56) References Cited

U.S. PATENT DOCUMENTS 7,194,768 B2* 3/2007 Kisliakov ........................ 726/20
7,436,957 B1* 10/2008 Fischer et al. ................... 380/53

FOREIGN PATENT DOCUMENTS

CN 101079088 A 11/2007

* cited by examiner

Primary Examiner — Hosuk Song
(74) Attorney, Agent, or Firm — Altis Law Group, Inc.

(57) ABSTRACT

An encryption/decryption system includes a displaying unit, an operating unit, a pressure sensing unit and an indicating unit. The displaying unit is configured for displaying files. The operating unit is configured for selecting a desired file to be encrypted or decrypted. The pressure sensing unit is integrated with the operation of sensing a pressure applied on the operating unit and producing a signal corresponding to the sensed pressure. The indicating unit is integrated on the operating unit. The indicating unit is configured for receiving the signal outputted from the pressure sensing unit, emitting a sensible signal according to the signal associated with a sensed pressure, and recording a signal associated to the pressure and the duration of the pressure as a mixed password for use in the operation of encryption or decryption of the selected file.

18 Claims, 3 Drawing Sheets

ENCRYPTION/DECRYPTION SYSTEM AND METHOD THEREOF

BACKGROUND

1. Technical Field

The present disclosure relates to encryption/decryption systems, and more particularly, to an encryption/decryption system and a method thereof for protecting files stored in electronic devices, such as computers, from unauthorized access.

2. Description of Related Art

With the introduction of personal computers (PCs) and network, any information stored in the PC can be accessed more easily. Therefore, data encryption technology has developed to protect the information from unauthorized access. The most widely accepted method of the encryption technology is by inputting a string of codes to encrypt a file or a document via a keyboard or other input devices. However, the encryption method needs to manually inputted using the keyboard, thus the operation is very inconvenient for user.

Therefore, what is needed is to provide an encryption/decryption system and a method thereof in which the above problem is eliminated or at least alleviated.

DETAILED DESCRIPTION

Figure 1:
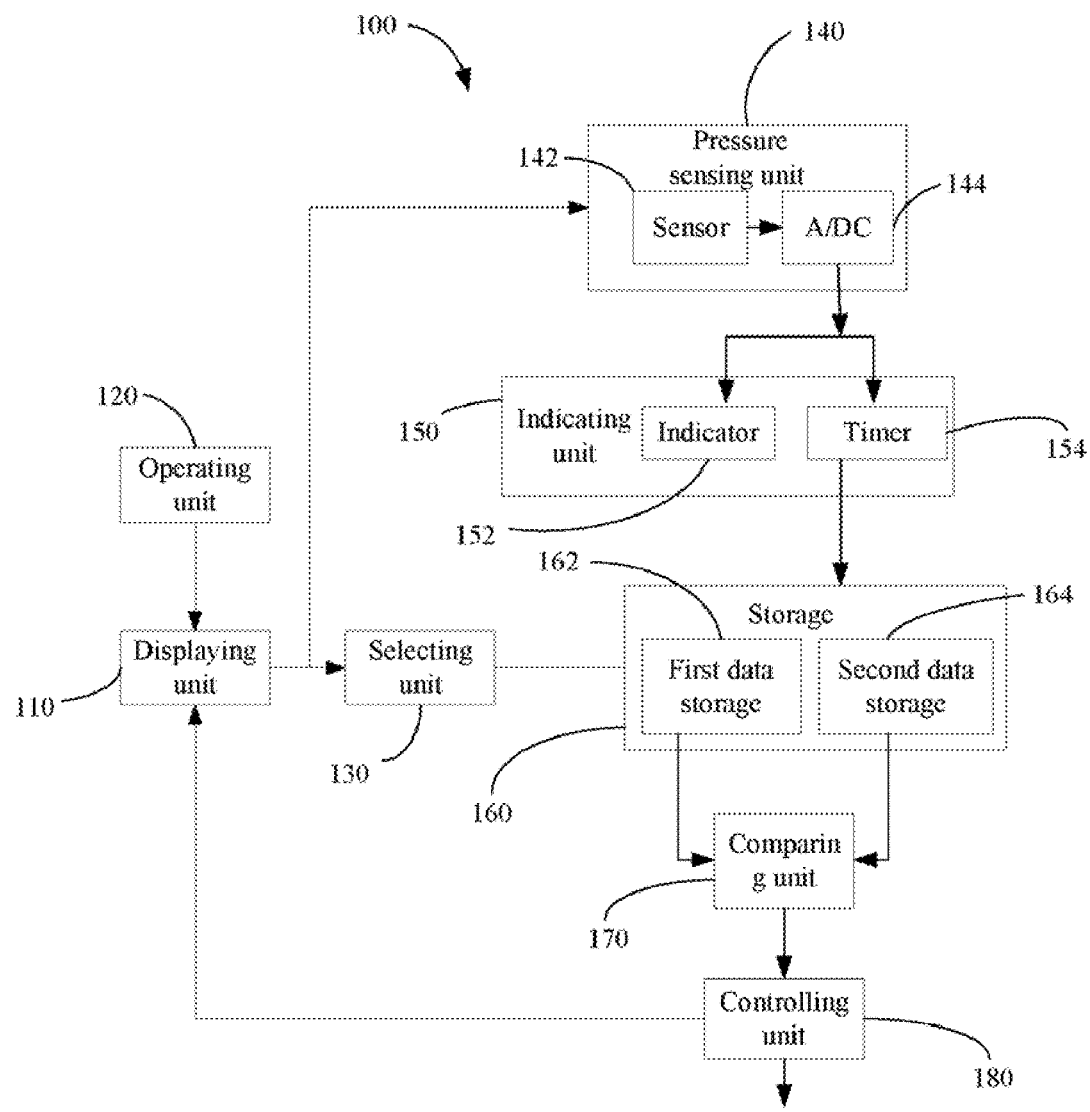
FIG. 1 is a block diagram of an encryption/decryption system according to an exemplary embodiment.

Referring to FIG. 1, an encryption/decryption system 100 according to an exemplary embodiment is shown. The encryption/decryption system 100 includes a displaying unit 110, an operating unit 120, a selecting unit 130, a pressure sensing unit 140, an indicating unit 150, a storage 160, a comparing unit 170, and a controlling unit 180.

The displaying unit 110 is used for displaying an icon of a file stored in the storage 160, and providing a selection menu with many selection options such as, paste, copy, cut, selectable according to different needs. The task selections are composed of at least an encryption option and a decryption option. While encrypting or decrypting a selected file, a dialog box with a first text field and a second text field is produced and shown on the displaying unit 110. When a first code and a second code have been inputted into the text fields of the dialog box, the codes will be stored in the storage 160.

The operating unit 120 is a control terminal to input commands. The commands include, for example, selecting a file, opening a selected file, encrypting or decrypting the selected file. In this embodiment, the function of the operation unit 120 can be carried out by a mouse.

The selecting unit 130 can be installed to the operating unit 120 for generating a first code. When a first code has been generated and displayed in the first text field by the selecting unit 130, the first code is stored in the storage 160. The effectiveness (or level of security) for encryption is measured in terms of the length of the code (password), the longer the code (password), the harder to crack the key (password). Therefore, the selecting unit 130 is employed to input an additional code to increase the difficulties of cracking an encryption code, thereby improving the security of the file.

The functions of the selecting unit 130 can be achieved by a hardware component, or other software component (executable program unit). Alternatively, the selecting unit 130 can be deactivated if a file does not need to be encrypted by a complicated password.

The pressure sensing unit 140 can be integrated on the operating unit 120, and can be pressed conveniently. The pressure sensing unit 140 is used for sensing a pressure applied on the operating unit 120 and repeatedly producing a detected pressure signal correspondingly. In this embodiment, the pressure sensing unit 140 includes a sensor 142 and an analog/digital convertor 144 (A/DC) connected to the sensor 142. The sensor 142 repeatedly produces an analog pressure signal according to the pressure on the operating unit 120. The A/DC 140 is used for converting the analog pressure signal into a digital pressure signal and then outputting the digital pressure signal.

The indicating unit 150 can be integrated on the operating unit 120 and coupled to the pressure sensing unit 140. The indicating unit 150 is used for receiving the digital pressure signal from the pressure sensing unit 140 and emitting various sensible signals according to the various digital pressure signals associated to different pressures. If the digital pressure signal is repeatedly produced for at least a predetermined time period, the indicating unit 150 would record the digital pressure signal and a pressure duration corresponding to how long the digital pressure signal is repeatedly produced. Both the digital pressure signal and the pressure duration are combined as a mixed code which is to be inputted into the second text field by the indicating unit 150 when encrypting and decrypting. In this embodiment, the indicating unit 150 includes an indicator 152 and a timer 154. The indicator 152 is used for outputting the sensible signals e.g., light, sound and so on. The timer 154 is used for timing the duration of the pressure corresponding to the digital pressure signal. In this embodiment, a threshold duration of a pressure is predetermined in the timer 154. The threshold duration predetermined in the timer 154 is provided for the timer 154 to determine whether to start timing a duration of the pressure signal. When the duration of the pressure corresponding to the digital pressure signal exceeds the threshold, the timer 154 initiates timing the duration of the digital pressure signal associated to the pressure until the pressure has changed. Then the timer 154 records the digital pressure signal and the pressure duration of digital pressure signal. The digital pressure signal and pressure duration of the digital pressure signal are combined as a second code. The second code is then inputted in the other text field of the dialog box shown on the displaying unit 110 and stored in the storage 160 to be used to encrypt or decrypt a selected file.

The storage 160 is used for storing the first and second codes inputted into the text fields of the dialog box shown on the displaying unit 110. In this embodiment, the storage 160 includes a first data storage 162 and a second data storage 164. The first data storage 162 is used for storing the first and second codes which are referred to as encryption codes for distinguishable purpose during encrypting operation. The second data storage 164 may be a cache or a buffer and is used for storing the first and second codes which are referred to as decryption codes during decrypting operation.

The comparing unit 170 and the controlling unit 180 are only used during decryption, but they are combined in the encryption/decryption system 100 to achieve the function of decrypting.

The comparing unit 170 is operable to decrypt an encrypted file. The comparing unit 170 decrypts an encrypted file via comparing the decryption codes stored in the second data storage 164 with the encryption codes stored in the first data storage 162 to determine whether they are matched with each other, and if did, the comparing unit 170 would send an success signal to the controlling unit 180 to allow access for a desired file. Otherwise the comparing unit 170 would send a failure signal to the controlling unit 180 to accordingly produce an error message shown on the displaying unit 110 for prompting the viewer or user. Alternatively, the decryption codes can be sent to the comparing unit 170 directly instead of storing in the second data storage 164.

The controlling unit 180 is used for executing a corresponding operation according to the signals outputted from the comparing unit 170. When the comparing unit 170 outputs a success signal, the controlling unit 180 will execute an operation, e.g., opening, viewing, modifying, and copying, on a desired file. When the comparing unit 170 outputs a failure signal, the controlling unit 180 will produce an error message that indicates the decrypting index code and the decrypting password is wrong, and the message is shown on the displaying unit 110.

In an encryption process, a desired file can selected from many files e.g., videos, photos, documents and so on, which are displayed on the displaying unit 110. A dialog box is generated and shown on the displaying unit 120 with two text fields. A pair of encryption codes is respectively inputted into the text fields by the selecting unit 130 and the combination of pressure sensing unit 140 and the indicating unit 150. Then the inputted encryption codes are stored into the storage 160, thus the encryption process of the desired file has been finished.

In decryption process, a pair of decryption codes is inputted into the text fields of the dialog box by such a manner as similar as in the encryption process. When the decryption codes have been inputted, the comparing unit 170 compares the decryption codes with the encryption codes of the selected file to determine whether the decryption codes are right or not, and if right the comparing unit 170 sends an success signal to the controlling unit 180 to allow accessing of the selected file, otherwise sends a failure signal to reject an accessing for selected file.

As the foregoing description of the use of encryption/decryption system 100, an encrypting process or a decrypting process of a files can be completed conveniently and easily by the selecting unit 130, the combination of the pressure sensing unit 140 and the indicating unit 150.

Figure 2:
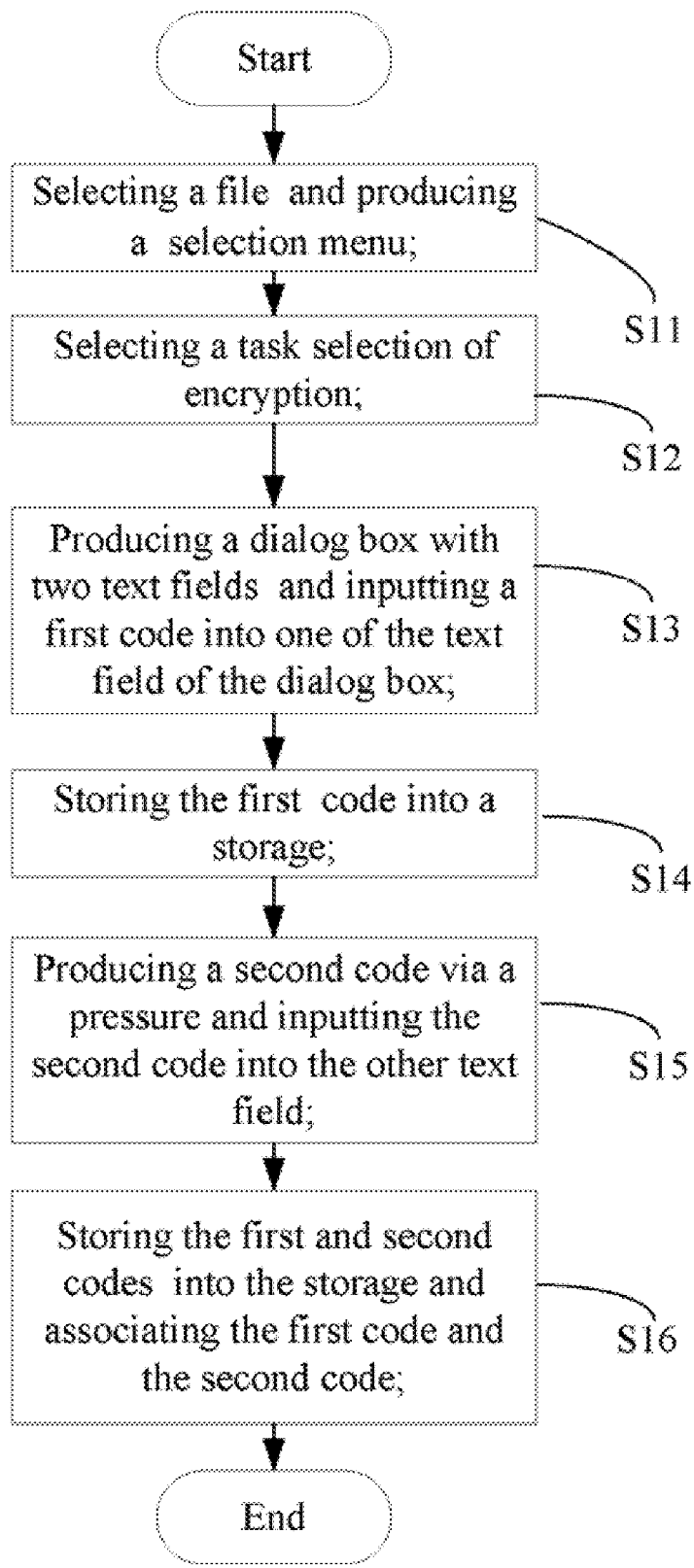
FIG. 2 is a flowchart of an encryption method of the encryption/decryption system of FIG. 1.

Referring to FIG. 2, an encrypting method of the encryption/decryption system 100 according to an exemplary embodiment includes the following steps S11 to S17.

In Step S11, a file is selected and a selection menu is produced. The selection menu includes at least two task selections of encryption or decryption. In this step, a file is selected by the operating unit 120 from many files which are shown on the displaying unit 110. A selection menu with a number of task selections associated to the selected file is triggered by the operating unit 120.

In Step S12, a task selection of encryption is selected. In this step, the operating unit 120 selects an encryption selection from the selection tasks of the selection menu of the selected file.

In Step S13, a dialog box with two text field is produced and a first code is produced and inputted into one of the text field of the dialog box. In this step, a dialog box is produced and shown on the displaying unit for prompting to input encryption codes. A first code is produced and inputted into one of text fields by the selecting unit 130.

In Step S14, the first code is stored in a storage 160.

In Step S15, a second code is inputted in another text field by the combination of the pressure sensing unit 140 and the indicating unit 150. In details, a pressure is supplied on an operating unit 120. The pressure is detected by a pressure sensing unit 140 attached on the operating unit 120, at the same time an indicating signal is emitted by an indicating unit 150 to indicate whether the strength of the pressure is changed. If the pressure is sustained for a predetermined time period, the indicating unit 150 records the value of the pressure and the duration of the pressure, and combines them as a second code. The second code is inputted in the rest text field.

In Step S17, the second code is then stored in the storage 160 and associated with the first code stored in the storage, thereby finishing the encryption of the selected file.

Figure 3:
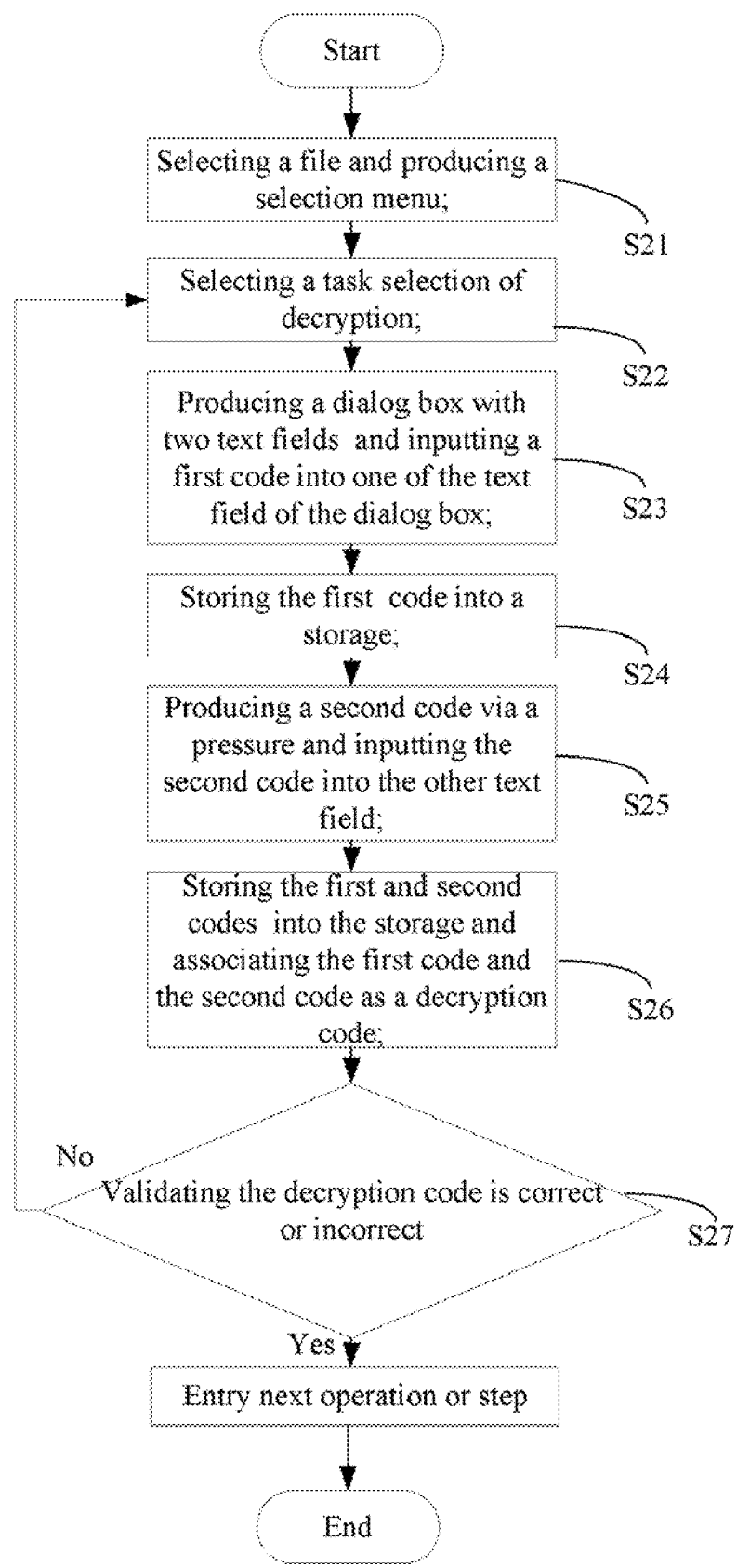
FIG. 3 is a flowchart of a decryption method of the encryption/decryption system of FIG. 1.

Referring FIG. 3, a decrypting method of the encryption/decryption system 100 according to a preferable embodiment includes following steps as S21 to S27. For simplification, the details in the steps of decrypting method similar as that in encrypting method are omitted.

In Step S21, a file is selected and a selection menu is produced. The selection menu includes at least two task selections of encryption or decryption.

In Step S22, a task selection of decryption is selected.

In Step S23, a dialog box with two text field is produced. A first code is produced and inputted into one of the text fields by the selecting unit 130.

In Step S24, the first code is stored in a storage unit. Preferably, the first code is stored into a cache memory of the storage.

In Step S25, a second code is inputted in another text field by the combination of the pressure sensing unit 140 and the indicating unit 150.

In Step S26, the second code is stored in the storage and associated to the first code stored in the storage as a decryption code. Preferably, the decryption codes are stored into a cache memory of the storage.

In Step S27, the decryption code is verified or validated whether is correct or incorrect by comparing them with an encryption codes of the selected file via a comparing unit 170, and if the decryption codes are correct the comparing unit 170 sends a success signal to authorize a controlling unit to access the selected file, otherwise sends a failure signal to the controlling unit to produce a massage for prompting re-inputting and return to step S23 to input a new decryption code again.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A computing system for encryption/decryption files stored in an electronic device, the computing system comprising:

a displaying unit used for displaying icons representing files;

an operating unit used for selecting a desired file to be encrypted or decrypted;

a pressure sensing unit integrated on the operating unit and comprising:

a sensor used for sensing a pressure applied on the operating unit to produce a signal corresponding to the pressure; and an analog/digital convertor configured for converting the signal corresponding to the pressure into a digital pressure signal;

an indicating unit integrated on the operating unit, and used for receiving the digital pressure signal converted from the pressure sensing unit, emitting a sensible signal according to the signal associated to a sensed pressure, and recording a signal associated to the sensed pressure and a duration of the sensed pressure as an encryption code or decryption code for encrypting or decrypting the desired file; and at least one processor for executing programs associated with at least one of the display unit, the operating unit, the pressure sensing unit, and the indicating unit.

2. The computing system as claimed in claim 1, wherein the displaying unit provides a selection menu for the selected file; the selection menu comprises at least two task selections of encryption and decryption.

3. The computing encryption/decryption system as claimed in claim 1, wherein the indicating unit comprises an indicator and a timer; the indicator is configured for emitting sensible signals according to the digital pressure signal outputted from the analog/digital convertor, the timer is configured for timing the duration of a digital pressure signal, recording a digital pressure signal if it is invariant for a predetermined time period and a duration of the digital pressure signal, then combining the duration and the digital pressure signal as a code.

4. The computing system as claimed in claim 3, wherein the timer comprises a threshold duration predetermined for the timer to estimate whether to initiate timing the duration of the digital pressure signal; when the duration of the digital pressure signal exceeds the threshold duration, the timer initiate to time the duration of the digital pressure signal until the digital pressure signal has changed.

5. The computing system as claimed in claim 4, wherein the displaying unit provides a selection menu for the selected file; the selection menu comprises at least two task selections of encryption and decryption.

6. The computing system as claimed in claim 4, further comprising a selecting unit installed on the operating unit for generating a code that is associated to the code produced by the indicating unit.

7. The computing system as claimed in claim 6, further comprising a comparing unit configured for decrypting the selected files and outputting a signal indicating that a decryption code is correct or incorrect.

8. The computing system as claimed in claim 7, further comprising a controlling unit configured for executing a corresponding operation according to the signal outputted from the comparing unit.

9. The computing system as claimed in claim 3, wherein the displaying unit provides a selection menu for the selected file; the selection menu comprises at least two task selections of encryption and decryption.

10. The computing system as claimed in claim 3, further comprising a selecting unit installed on the operating unit for generating a code that is associated with the code produced by the indicating unit.

11. The computing system as claimed in claim 10, further comprising a comparing unit configured for decrypting the selected files and outputting a signal indicating that a decryption code is correct or incorrect.

12. The computing system as claimed in claim 11, further comprising a controlling unit configured for executing a corresponding operation according to the signal outputted from the comparing unit.

13. The computing system as claimed in claim 1, further comprising a selecting unit installed on the operating unit for generating a code that is associated to the code produced by the indicating unit.

14. The computing system as claimed in claim 13, further comprising a comparing unit configured for decrypting the selected files and outputting a signal indicating that a decryption code is correct or incorrect.

15. The computing system as claimed in claim 14, further comprising a controlling unit configured for executing a corresponding operation according to the signal outputted from the comparing unit.

16. The computing system as claimed in claim 1, further comprising a storage including a first data storage and a second data storage; the first data storage is configured for storing encryption codes produced in encryption operations; the second data storage is configured for storing decryption codes produced in decryption operations.

17. An encrypting method of a computing system comprising the following steps:

selecting a file from a storage and producing a selection menu displayed on a displaying unit, the selection menu comprising at least two task selections of encryption and decryption;

selecting a task selection of encryption displayed on the displaying unit using an operating device;

producing a dialog box with two text fields displayed on the displaying unit, and inputting a first code using the operating device into one of the two text fields;

storing the first code in the storage unit;

detecting a pressure by a sensing unit, while emitting an indicating signal by an indicating unit to indicate whether the strength of the pressure is changed, and if the pressure is sustained for a predetermined time period, the indicating unit recording the value of the pressure and the duration of the pressure as a second code and inputting the second code into the other one of the text fields; and the second code stored in the storage and associated to the first code stored in the storage to complete encryption of the selected file.

18. A decrypting method of a computing system comprising the following steps:

selecting a file from a storage and producing a selection menu displayed on a displaying unit, the selection menu comprising at least two task selections of encryption and decryption;

selecting a task selection of encryption displayed on the displaying unit using an operating device;

producing a dialog box with two text fields displayed on the displaying unit, and inputting a first code using the operating device into one of the text fields;

storing the first code in the storage;

detecting a pressure by a sensing unit, while emitting an indicating signal by an indicating unit to indicate whether the strength of the pressure is changed, and if the pressure is sustained for a predetermined time period, the indicating unit recording the value of the pressure and the duration of the pressure as a second code and inputting the second code in the other text filed;

the second code stored in the storage and associated to the first code stored in the storage as a decryption code; and validating the decryption code whether is correct or incorrect by comparing it with an original encryption code of the selected file, and if the decryption is right the selected file is authorized to be accessed, otherwise returning to the step of inputting decryption code again.

\* \* \* \* \*